(12) United States Patent
Sano

(10) Patent No.: US 10,428,862 B2
(45) Date of Patent: Oct. 1, 2019

(54) CABLE LINKING DEVICE

(71) Applicant: HI-LEX CORPORATION, Hyogo (JP)

(72) Inventor: Ritsu Sano, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 256 days.

(21) Appl. No.: 15/322,195

(22) PCT Filed: Jun. 25, 2015

(86) PCT No.: PCT/JP2015/068328
§ 371 (c)(1),
(2) Date: Dec. 27, 2016

(87) PCT Pub. No.: WO2015/199174
PCT Pub. Date: Dec. 30, 2015

(65) Prior Publication Data
US 2017/0138392 A1    May 18, 2017

(30) Foreign Application Priority Data
Jun. 27, 2014 (JP) .................. 2014-132738

(51) Int. Cl.
*F16C 1/14* (2006.01)
*F16C 1/10* (2006.01)

(52) U.S. Cl.
CPC ............. *F16C 1/145* (2013.01); *F16C 1/10* (2013.01)

(58) Field of Classification Search
CPC .... F16C 1/10; F16C 1/101; F16C 1/12; F16C 1/14; F16C 1/145
See application file for complete search history.

(56) References Cited

U.S. PATENT DOCUMENTS 4,887,930 A * 12/1989 Chaczyk ................ F16C 1/14
                                                    403/379.2
5,394,770 A *  3/1995 Boike .................... F16C 1/14
                                                    403/104
(Continued)

FOREIGN PATENT DOCUMENTS

| JP | 2003166521 A | 6/2003 |
| JP | 2008-101718 A | 5/2008 |
| JP | 4967142 B2 | 7/2012 |

OTHER PUBLICATIONS

International Search Report from International Application No. PCT/JP2015/068328 dated Sep. 15, 2015.

*Primary Examiner* — Jonathan P Masinick
(74) *Attorney, Agent, or Firm* — Brundidge & Stanger, P.C.

(57) ABSTRACT

In this cable linking device, when a lock member (16) is located in a restricting position for restricting the movement of a joint piece (13), an interposing member (17) can move to an interposing position between the lock member (16) and a holding member (11) and the interposing member (17) can be shifted between the interposing position and a movement-permitting position, and when the interposing member (17) has moved to the interposing position, the lock member (16) is restricted from moving to a restriction release position for releasing the restriction on the movement of the joint piece (13), therefore preventing a linking member from accidentally moving farther into the holding member.

4 Claims, 7 Drawing Sheets

(56) References Cited

U.S. PATENT DOCUMENTS

| | | | | |
|---|---|---|---|---|
| 5,598,743 A * | 2/1997 | Yasuda | ............... | F16C 1/14 |
| | | | | 403/11 |
| 5,605,074 A * | 2/1997 | Hall | ............... | F16C 1/14 |
| | | | | 74/502.4 |
| 5,655,415 A * | 8/1997 | Nagle | ............... | F16C 1/101 |
| | | | | 74/501.5 R |
| 5,664,462 A * | 9/1997 | Reasoner | ............... | F16C 1/101 |
| | | | | 74/502.4 |
| 5,673,596 A * | 10/1997 | Lu | ............... | F16C 1/14 |
| | | | | 74/502.4 |
| 6,116,111 A * | 9/2000 | Burger | ............... | F16C 1/14 |
| | | | | 24/DIG. 48 |
| 6,595,080 B2 * | 7/2003 | Waldow | ............... | F16C 1/14 |
| | | | | 403/326 |
| 7,044,018 B2 * | 5/2006 | Sanchez | ............... | F16C 1/108 |
| | | | | 403/135 |
| 7,779,720 B2 * | 8/2010 | Ruhlander | ............... | F16C 1/14 |
| | | | | 74/502.4 |
| 8,646,355 B2 * | 2/2014 | Lee | ............... | F16C 1/101 |
| | | | | 74/502.4 |
| 2006/0230868 A1 | 10/2006 | Ruhlander et al. | | |

\* cited by examiner

CABLE LINKING DEVICE

TECHNICAL FIELD

The present invention relates to a cable linking device.

BACKGROUND ART

A relay device that relays two inner cables is disclosed in Patent Literature (hereinafter, referred to "PTL") 1. The relay device disclosed in PTL 1 includes: a joint piece which links two inner cables together; a casing having a space in which the joint piece can move; and a lock member which restricts or allows movement of the joint piece. In this relay device, until the two inner cables are linked to the joint piece, the lock member needs to be kept in a lock state in which movement of the joint piece is restricted.

The lock member is partially engaged with slits formed in an outer periphery of the casing, and when pulled up from the casing, the lock member is set to the lock state in which the lock member restricts movement of the joint piece, and when pushed down onto the casing, the lock member is set to an unlock state in which the lock member allows movement of the joint piece.

CITATION LIST

Patent Literature

PTL 1
Japanese Patent No. 4967142

SUMMARY OF INVENTION

Technical Problem

However, when the lock member is unexpectedly pushed down due to some sort of impact during transportation of the relay device, the lock member is set to the unlock state, and a linking member moves deeper inside the casing. For this reason, in order to link the inner cables in this case, it requires extra handling which is to take out the linking member from deeper inside the casing.

It is therefore an object of the present invention to provide a cable linking device which prevents a linking member from accidentally moving deeper inside a holding member.

Solution to Problem

A cable linking device according to an aspect of the present invention includes: an inner cable; a linking member configured to link a link target with the inner cable; an outer casing configured to cover an outer periphery of the inner cable; a holding member connected to an end portion of the outer casing and configured to movably hold the linking member; a restricting member capable of being displaced between a restricting position and an unrestricting position, the restricting member being configured to restrict, when moved to the restricting position, the linking member from moving from a linking position allowing an operation to link the link target with the linking member to be performed to a depth side position closer to the outer casing than the linking position in the holding member, and configured to allow, when moved to the unrestricting position, the linking member to move from the linking position to the depth side position; and an interposing member capable of moving to an interposing position between the restricting member and the holding member and being displaced between the interposing position and a movement allowing position when the restricting member is disposed at the restricting position, the interposing member being configured to restrict, when moved to the interposing position, the restricting member from moving to the unrestricting position, and configured to allow, when moved to the movement allowing position, the restricting member to move to the unrestricting position.

Advantageous Effects of Invention

According to the present invention, an interposing member is capable of moving to an interposing position between a restricting member and a holding member and also being displaced between the interposing position and a movement allowing position when the restricting member is disposed at a restricting position, and when moved to the interposing position, the interposing member restricts the restricting member from moving to an unrestricting position. Thus, a linking member can be prevented from accidentally moving deeper inside the holding member.

DESCRIPTION OF EMBODIMENTS

Hereinafter, an embodiment of the present invention will be described in detail with reference to the accompanying drawings.

Figure 1:
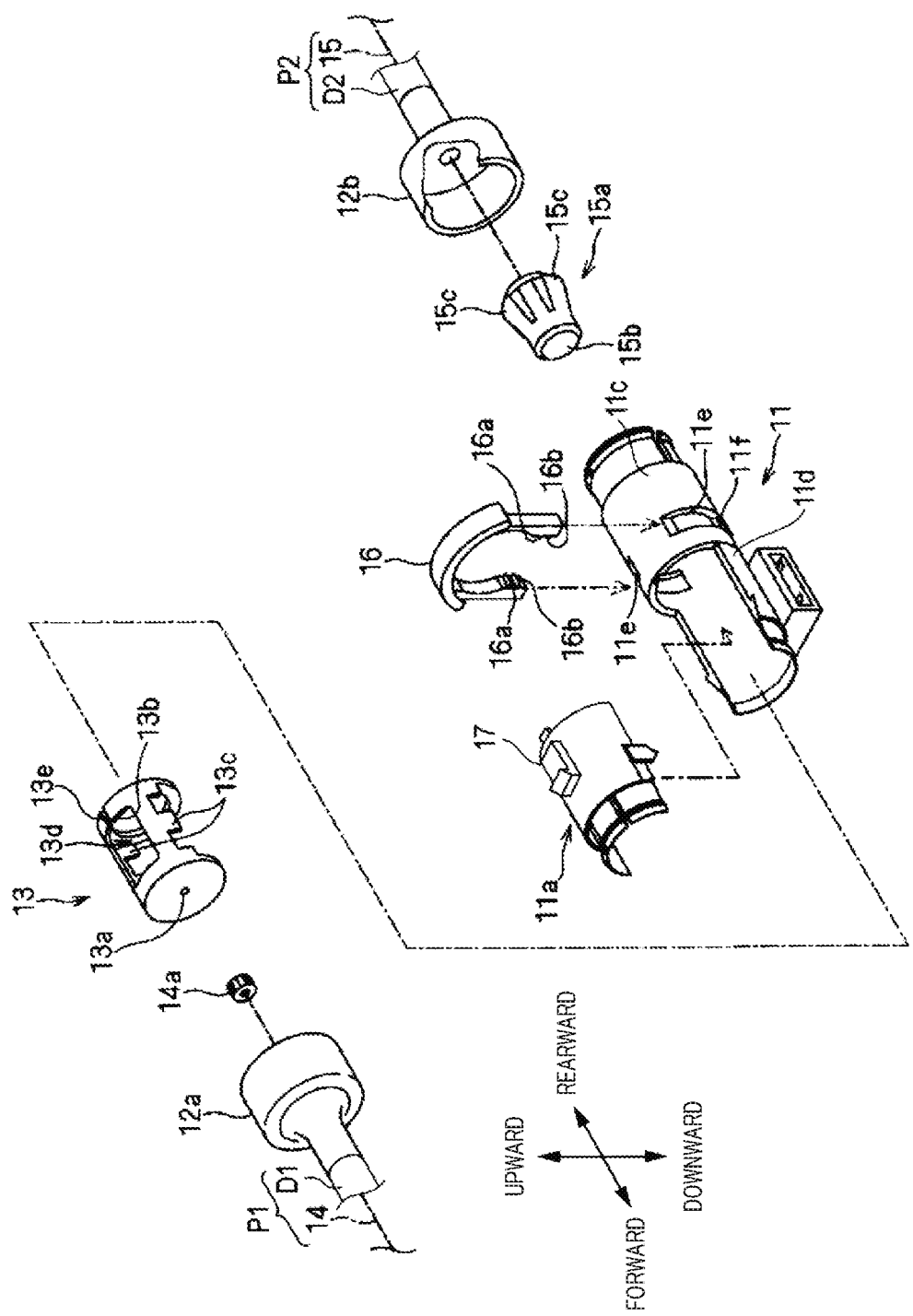
FIG. 1 is an exploded perspective view of a cable linking device according to an embodiment of the present invention.
Figure 2:
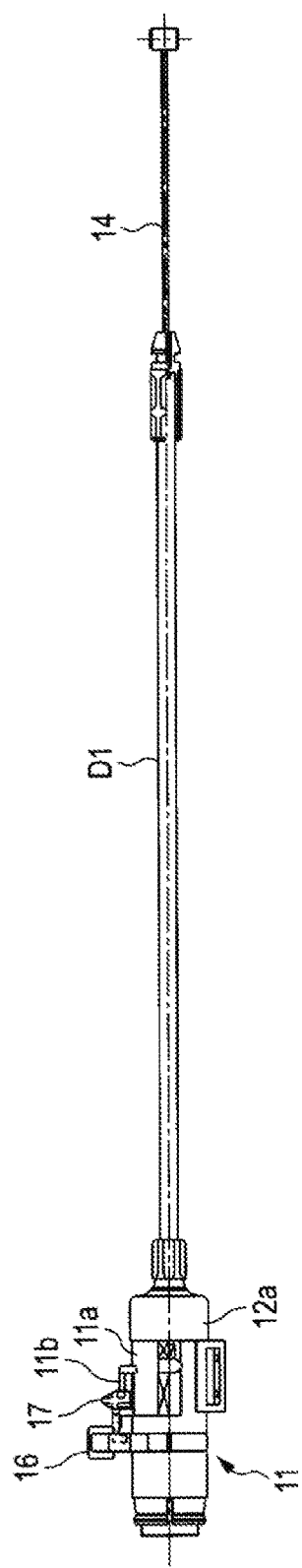
FIG. 2 is a side view of the cable linking device.
Figure 3:
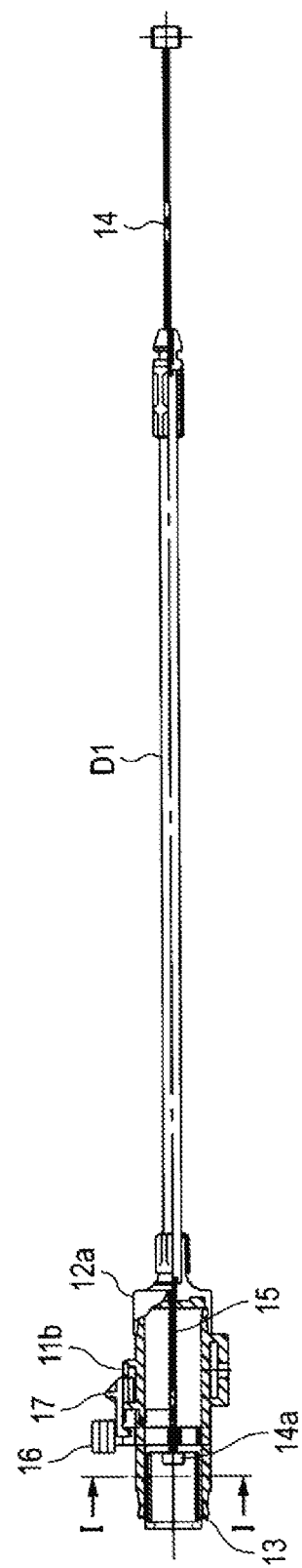
FIG. 3 is a side view of the cable linking device, including a partially cutaway portion of the cable linking device.
Figure 4A:
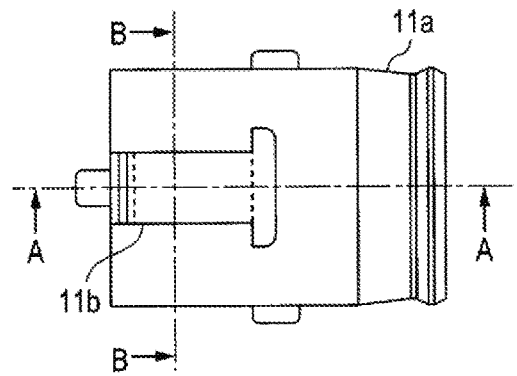
FIG. 4A is a top view of a lid piece.
Figure 4B:
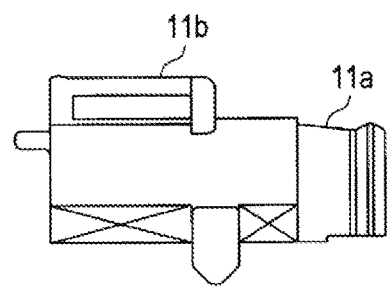
FIG. 4B is a side view of the lid piece.
Figure 4C:
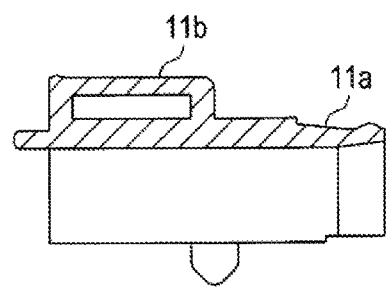
FIG. 4C is a cross-sectional view taken along line A-A of FIG. 4A.
Figure 4D:
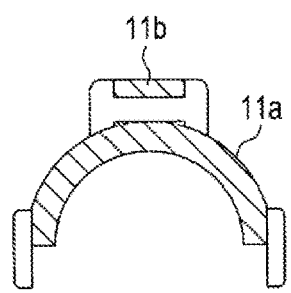
FIG. 4D is a cross-sectional view taken along line B-B of FIG. 4A.

FIG. 1 is an exploded perspective view of a cable linking device according to an embodiment of the present invention. FIG. 2 is a side view of the cable linking device. FIG. 3 is a side view of the cable linking device, including a partially cutaway portion of the cable linking device. FIG. 4A is a top view of a lid piece, FIG. 4B is a side view of the lid piece, FIG. 4C is a cross-sectional view taken along line A-A of FIG. 4A, and FIG. 4D is a cross-sectional view taken along line B-B of FIG. 4A. In the following description, the directions illustrated in FIG. 1 are defined as forward, rearward, upward and downward directions for the sake of convenience.

The cable linking device according to this embodiment includes holding member 11, cap member 12a, first inner cable 14, first outer casing D1, lock member 16, and interposing member 17, and/or the like. Holding member 11, lid piece 11a, and cap member 12a may be integrated into a single body. Furthermore, the cable linking device includes second inner cable 15, second outer casing D2, cap member 12b, and second cable end 15a as a link destination configuration.

Holding member 11 is a member configured to movably hold joint piece 13 which is a linking member. In holding member 11, an engagement portion which engages with lid piece 11a is formed on a peripheral wall of half-cylinder portion 11d which is formed forward of main body portion 11c. Meanwhile, an engagement portion is formed on both lateral sides of a peripheral wall in the forward direction in lid piece 11a so as to engage with the engagement portion of holding member 11. When holding member 11 and lid piece 11a are engaged with each other, a cylindrical body communicating with a cylindrical portion in the rearward of half-cylinder portion 11d is formed and movably holds therein joint piece 13. A forward end of holding member 11 is opened, so that join piece 13 can move with protrusion of one end of joint piece 13 from the opening. As illustrated in FIGS. 4A through 4D, guide member 11b is formed in a part of an outer peripheral surface of lid piece 11a, and interposing member 17 to be described hereinafter slides along guide member 11b.

Cap member 12a is freely detachable from holding member 11 and is engaged with holding member 11 so as to cap the opening of the cylindrical body formed by half-cylinder portion 11d and lid piece 11a of holding member 11 from a forward direction of holding member 11 where lid piece 11a is engaged. Cap member 12a has a bottomed cylindrical shape and is capable of temporarily holding therein one end side of joint piece 13 which is the linking member. For this reason, when cap member 12a is engaged with holding member 11, joint piece 13 which is the linking member is inserted into an inner space of holding member 11 and held therein. In addition, lid piece 11a is structured not to easily fall off from holding member 11, and when lid piece 11a is removed from holding member 11, a forward portion of holding member 11 opens upward, so that it is made possible to adjust a position of joint piece 13.

An outer casing extending forward is first outer casing D1 of first control cable P1 and an outer casing extending rearward is second outer casing D2 of second control cable P2.

As illustrated in FIG. 1, joint piece 13 (which corresponds to the linking member) is movably disposed inside holding member 11 in a forward-rearward direction. First inner cable 14 slidably housed in first outer casing D1 is locked to a forward portion of joint piece 13. Meanwhile, second inner cable 15 slidably housed in second outer casing D2 is locked to a rearward portion of joint piece 13.

Joint piece 13 is fixed to a leading end of first inner cable 14 by swaging first cable end 14a which is a member having a larger thickness than first inner cable 14. Moreover, second cable end 15a having a larger thickness than second inner cable 15 is fixed to a leading end of second inner cable 15. Although second cable end 15a is not limited to a particular configuration, end body 15b having a cylindrical shape axially continuous from second inner cable 15 and spring plates 15c expanding outwardly rearward from a forward end and covering an outer periphery of end body 15b are formed in second cable end 15a. Note that, second cable end 15a is fixed to the leading end of second inner cable 15 by casting, but can be fixed by swaging as well.

Joint piece 13 is composed of: first lock portion 13a in which a hole for locking first cable end 14a of first inner cable 14 disposed in a forward portion is formed; second lock portion 13b having an opening provided for locking second cable end 15a of second inner cable 15 in a rearward portion disposed so as to face first lock portion 13a; and two side surface portions 13c which connect both sides of first and second lock portions 13a and 13b. Joint piece 13 as a whole exhibits an outer shape so as to conform to holding member 11, and side surface portions 13c are disposed at both sides, and through-hole 13d through which second cable end 15a can be inserted in an upward-downward direction is formed.

In addition, slit 13e communicating with through-hole 13d is formed in second lock portion 13b, and second inner cable 15 can be inserted through slit 13e. Moreover, when inserted from the rearward of first lock portion 13a of joint piece 13, spring plates 15c of second cable end 15a of second inner cable 15 can be inserted through from the rearward while being elastically deformed inward, and after being inserted through, spring plates 15c that have returned to the original shape expand outward, thus being locked.

As illustrated in FIG. 1, slits 11e are each formed near a middle portion of an outer periphery of holding member 11. Slit engagement portion 11f is formed at a lower end of each of slits 11e. Both leg portions of lock member 16 having a bifurcated shape (which corresponds to the restricting member) are inserted into slits 11e without being limited in particular.

As illustrated in FIGS. 5A through 6C, two-step inward protrusions are formed on both leg portions of lock member 16. More specifically, first protrusion 16a which is an upper protrusion protrudes from near a middle of each of the leg portions of lock member 16, and second protrusion 16b protrudes from a leading end portion of each of the leg portions below first protrusion 16a.

Figure 5A:
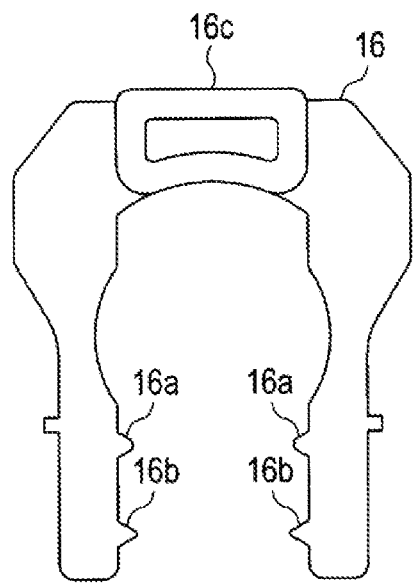
FIG. 5A is a front view of a lock member.
Figure 5B:
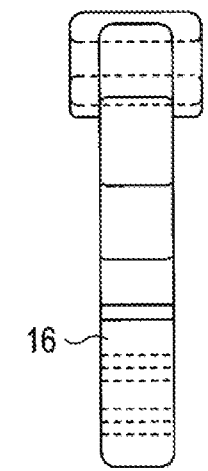
FIG. 5B is a side view of the lock member.
Figure 5C:
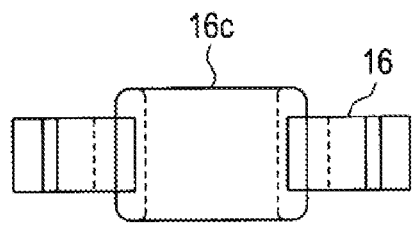
FIG. 5C is a top view of the lock member.

Lock member 16 is displaced between the following two positions in accordance with the amount of lock member 16 pushed into slits 11e of holding member 11. More specifically, the two positions include a restricting position where second protrusions 16b of lock member 16 are each engaged with slit engagement portion 11f of holding member 11 by pushing down lock member 16 into slits 11e by only a small amount (see FIG. 6B), and an unrestricting position where second protrusions 16b are each engaged with slit engagement portion 11f of holding member 11 by further pushing down lock member 16 into slits 11e (see FIG. 6C). Lock member 16, as illustrated in FIGS. 5A to 5C, includes pushed portion 16c which receives a pushing force for moving from the restricting position to the unrestricting position, and pushed portion 16c has a pushed surface spreading in a direction intersecting with a moving direction of lock member 16.

Figure 6A:
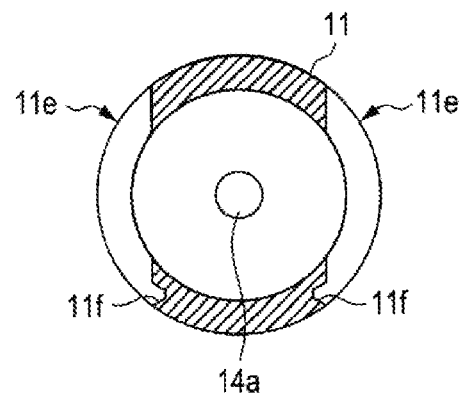
FIG. 6A is a cross-sectional view taken along line I-I of FIG. 3.
Figure 6B:
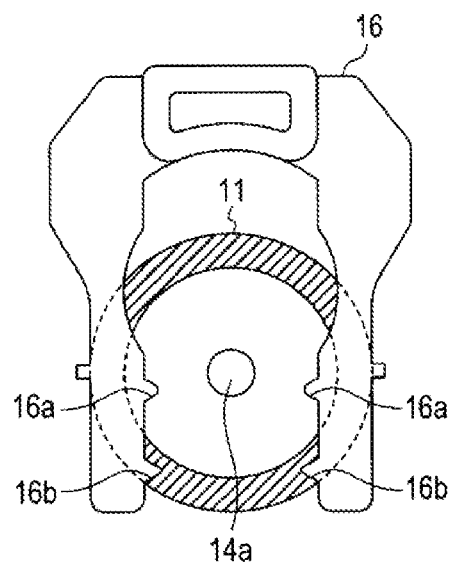
FIG. 6B is a diagram illustrating a state where the lock member is disposed at a restricting position.
Figure 6C:
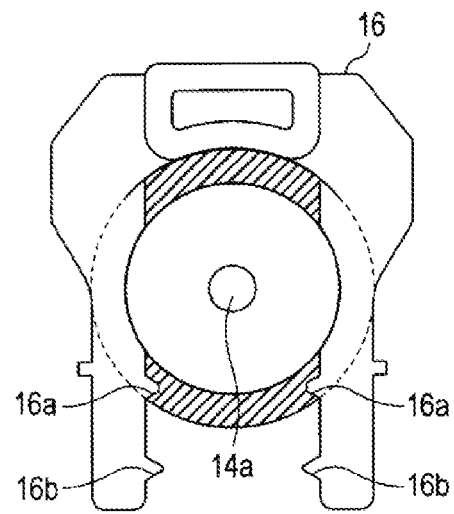
FIG. 6C is a diagram illustrating a state where the lock member is disposed at an unrestricting position.

As illustrated in FIG. 6B, first protrusions 16a of lock member 16 protrude from an inner surface of holding member 11 at the restricting position, so that lock member 16 restricts movement of joint piece 13. More specifically, in order to allow joint piece 13 to be engaged with second cable end 15a when holding member 11 is engaged with cap member 12b, joint piece 13 is restricted from moving to the forward portion (depth side or the side of first outer casing D1) of holding member 11 by causing lock member 16 to engage with holding member 11 at the restricting position in a state where joint piece 13 is held on a rearward side of holding member 11. Meanwhile, as illustrated in FIG. 6C, since first protrusions 16a of lock member 16 are engaged with slit engagement portions 11f of holding member 11 at the unrestricting position, lock member 16 does not prevent joint piece 13 from sliding.

Interposing member 17 is displaceable between an interposing position where interposing member 17 is interposed between lock member 16 and holding member 11 (see FIG.

Figure 7A:
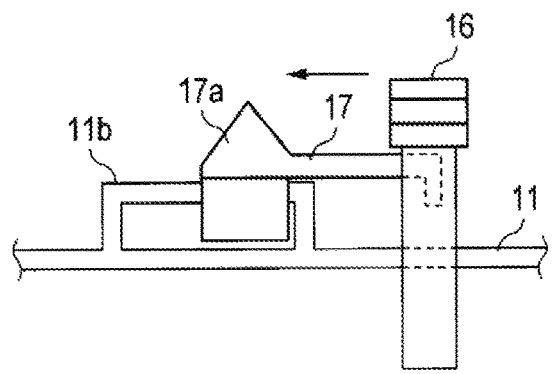
FIGS. 7A to 7C are diagrams for describing an operation of the locking member and an interposing member.
Figure 7B:
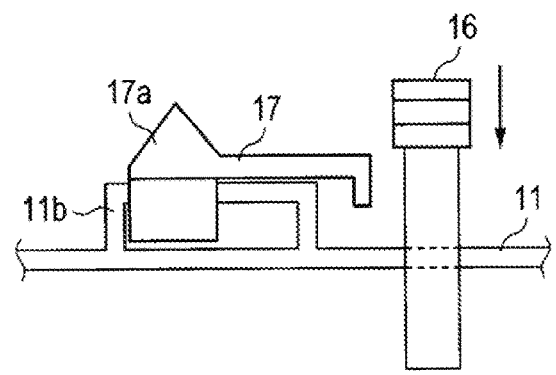

7A), and a movement allowing position where interposing member 17 allows movement of lock member 16 (see FIG. 7B). Note that, interposing member 17 can move to the interposing position when lock member 16 is disposed at the restricting position. When moved to the interposing position, interposing member 17 restricts lock member 16 from moving to the unrestricting position, and when moved to the movement allowing position, interposing member 17 allows lock member 16 to move to the unrestricting position. Note that, interposing member 17 slides in an axial direction of the inner cable with respect to holding member 11 and moves between the interposing position and the movement allowing position. As described herein, restricting lock member 16 by interposing member 17 from moving to the unrestricting position from the restricting position prevents a situation from occurring where the engagement of second cable end 15a and joint piece 13 to be completed by a simple linking operation in which cap member 12b and holding member 11 are engaged with each other becomes difficult due to movement of joint piece 13 to the forward side of holding member 11.

Furthermore, interposing member 17 includes operation portion 17a for performing a moving operation from the interposing position to the movement allowing position, and operation portion 17a is positioned near pushed portion 16c of lock member 16 when interposing member 17 is in the interposing position. Moreover, operation portion 17a has a protrusion which protrudes in a direction intersecting with a moving direction of interposing member 17. The term "near" used herein means a distance short enough to allow holding member 11 to be held with one hand and to allow operation portion 17a and pushed portion 16c to be touched with the same hand; particularly, with the same finger, without a change in the way to hold holding member 11 to touch these portions. Thus, an operation to be performed during a linking operation is made easy, in which holding member 11 is held with one hand while cap member 12a attached to holding member 11 is held with the other hand. This provides an excellent mass productivity.

Next, an operation of lock member 16 and interposing member 17 will be described with reference to FIGS. 7A to 7C. FIG. 7A illustrates a state where lock member 16 is positioned at the restricting position while interposing member 17 is positioned in the interposing position. At this time, since interposing member 17 is interposed between holding member 11 and lock member 16, lock member 16 is prevented from being pushed into slits 11e of holding member 11. In other words, interposing member 17 restricts lock member 16 at the restricting position from moving to the unrestricting position. Thus, even when a force in a direction in which lock member 16 can move to the unrestricting position acts due to some sort of impact during transportation of lock member 16, lock member 16 does not move to the unrestricting position. Accordingly, it is made possible to prevent accidental forward (toward depth side or the side of first outer casing D1) movement of joint piece 13.

FIG. 7B illustrates a state where lock member 16 is positioned at the restriction position while interposing member 17 is positioned at the movement allowing position. Interposing member 17 in FIG. 7B is in a state where interposing member 17 in FIG. 7A has been moved in the direction indicated by the arrow by operating operation portion 17a. In the state of FIG. 7B, interposing member 17 has been moved to the movement allowing position from the interposing position and lock member 16 can move from the restriction position to the unrestricting position.

Figure 7C:
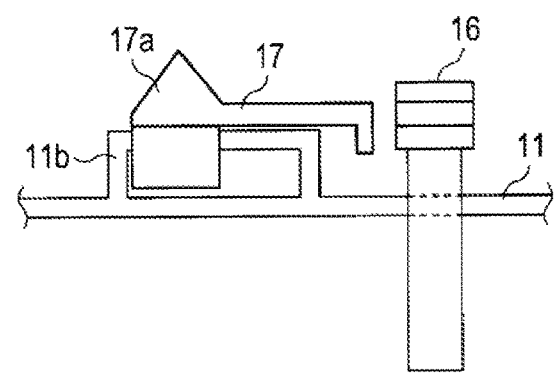

FIG. 7C illustrates a state where lock member 16 is positioned at the unrestricting position while interposing member 17 is positioned at the movement allowing position. Lock member 16 in FIG. 7C is in a state where pushed portion 16c of lock member 16 protruding from holding member 11 at the restricting position in FIG. 7B has been pushed by an external force and lock member 16 has moved in the direction indicating by the arrow. Moreover, since lock member 16 is positioned at the unrestricting position near holding member 11, joint piece 13 is movable within holding member 11 in the state of FIG. 7C.

As described above, operating lock member 16 and interposing member 17 in order of FIGS. 7A, 7B, and 7C makes it possible to move lock member 16 from the restricting position to the unrestricting position. At this time, since operation portion 17a of interposing member 17 and pushed portion 16c of lock member 16 are positioned near to each other, an operator can operate these portions with the thumb of one hand and can easily work in a narrow space.

Next, a procedure to replace first inner cable 14 and second inner cable 15 will be described. Cap member 12a is removed, and lid piece 11a is removed from holding member 11. Next, an attempt to pull out second inner cable 15 through slit 13e formed in second lock portion 13b of joint piece 13, so as to turn joint piece 13 makes it possible to pull out second cable end 15a of second inner cable 15 upward through through-hole 13d of joint piece 13.

Removal of cap member 12a and lid piece 11a from holding member 11 in the manner described above makes it possible to easily unlink first and second inner cables 14 and 15 and to take out joint piece 13 from inside holding member 11. Thus, a troublesome work such as completely disassembling holding member 11 or removal from a vehicle body is not required. Note that, after removal of lid piece 11a, first inner cable 14 or second inner cable 15 can be pulled out from holding member 11 without cutting of an inner cable positioned before first cable end 14a of first inner cable 14 or second cable end 15a of second inner cable 15.

Moreover, when first inner cable 14 is newly attached, first inner cable 14 provided with cap member 12a and joint piece 13 is prepared. Next, joint piece 13 is inserted through the opening in the forward portion of holding member 11. Second inner cable 15 locked to cap member 12b and second cable end 15a is prepared. Second inner cable 15 is attached by inserting second cable end 15a through opening 13e of joint piece 13 locked to first inner cable 14. Lastly, lid piece 11a is attached to holding member 11, and cap member 12a is fitted to an end portion of holding member 11 together with lid piece 11a.

As described above, according to this embodiment, interposing member 17 is provided, which is configured to be displaced between the interposing position between lock member 16 at the restricting position where movement of joint piece 13 is restricted and holding member 11, and the movement allowing position where movement of lock member 16 is allowed, and by moving interposing member 17 to the interposing position, joint piece 13 can be prevented from accidentally moving deeper inside holding member 11.

An embodiment has been described thus far.

Note that, in the embodiment described above, the case where joint piece 13 is configured to link two inner cables has been described. However, the present invention is not limited to this configuration as long as joint piece 13 is configured to link a single inner cable with a link target.

Moreover, in the embodiment described above, interposing member 17 has been described as being configured to slide in the axial direction of the inner cable and move.

However, the present invention is not limited to this configuration. For example, interposing member 17 may be configured to move in a direction perpendicular to the axial direction of the inner cable or to move in a direction to turn along a periphery of holding member 11 or to move in a direction obliquely intersecting with the axial direction of the inner cable.

INDUSTRIAL APPLICABILITY

The present invention is applicable to a cable linking device for linking an inner cable with a link target.

REFERENCE SIGNS LIST

11 Holding member
11*a* Lid piece
11*b* Guide member
11*c* Body portion
11*d* Half-cylinder portion
11*e* Slit
11*f* Slit engagement portion
12*a*, 12*b* Cap member
13 Joint piece
13*a* First engagement portion
13*b* Second engagement portion
13*c* Side surface portion
13*d* Through-hole
13*e* Slit
14 First inner cable
14*a* First cable end
15 Second inner cable
15*a* Second cable end
15*b* End body
15*c* Spring plate
16 Lock member
16*a* First protrusion
16*b* Second protrusion
16*c* Pushed portion
17 Interposing member
17*a* Operation portion
P1 First control cable
P2 Second control cable
D1 First outer casing
D2 Second outer casing

What is claimed is:

1. A cable linking device comprising:
  an inner cable;
  a linking member configured to link a link target with the inner cable;
  an outer casing configured to cover an outer periphery of the inner cable;
  a holding member connected to an end portion of the outer casing and configured to movably hold the linking member;
  a restricting member capable of being displaced between a restricting position and an unrestricting position, the restricting member being configured to restrict, when moved to the restricting position, the linking member from moving from a linking position allowing an operation to link the link target with the linking member to be performed to a depth side position closer to the outer casing than the linking position in the holding member, and configured to allow, when moved to the unrestricting position, the linking member to move from the linking position to the depth side position; and
  an interposing member capable of moving to an interposing position between the restricting member and the holding member and being displaced between the interposing position and a movement allowing position when the restricting member is disposed at the restricting position, the interposing member being configured to restrict, when moved to the interposing position, the restricting member from moving to the unrestricting position, and configured to allow, when moved to the movement allowing position, the restricting member to move to the unrestricting position, wherein:
  the restricting member includes a pushed portion having a pushed surface that receives a pushing force for moving from the restricting position to the unrestricting position, and
  the interposing member includes a restricting member side end portion that is disposed closer to the holding member than a predetermined position is, the predetermined position being a position of the pushed surface of the pushed portion having moved closer to the holding member with movement of the restricting member from the restricting position to the unrestricting position.

2. The cable linking device according to claim 1, wherein the interposing member slides in an axial direction of the inner cable with respect to the holding member and moves between the interposing position and the movement allowing position.

3. The cable linking device according to claim 1, wherein the interposing member includes an operation portion for performing a moving operation from the interposing position to the movement allowing position; wherein, the operation portion is positioned near the pushed portion in the interposing position, and when the interposing member is moved to the movement allowing position by operation of the operation portion and the pushed portion protruding from the holding member is pushed by an external force at the restricting position, the restricting member moves to the unrestricting position that is near the holding member.

4. The cable linking device according to claim 3, wherein:
the pushed surface extending in a direction intersecting with a moving direction of the restricting member, and
the operation portion includes a protrusion protruding in a direction intersecting with a moving direction of the interposing member.

\* \* \* \* \*